United States Patent
Bareis et al.

(10) Patent No.: US 8,752,445 B2
(45) Date of Patent: Jun. 17, 2014

(54) DEVICE FOR PRESSING A TOOTHED RACK

(71) Applicants: Helmut Bareis, Eschach (DE); Joachim Rosenthal, Schwaebisch (DE)

(72) Inventors: Helmut Bareis, Eschach (DE); Joachim Rosenthal, Schwaebisch (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/687,500

(22) Filed: Nov. 28, 2012

(65) Prior Publication Data

US 2013/0091979 A1    Apr. 18, 2013

(30) Foreign Application Priority Data

Jun. 2, 2010 (DE) .................. 10 2010 029 603

(51) Int. Cl.
*F16H 1/04* (2006.01)
*F16H 35/00* (2006.01)

(52) U.S. Cl.
USPC ........................................ 74/422; 74/388 PS

(58) Field of Classification Search
CPC ....... F16H 55/18; F16H 57/12; F16H 55/283; F16H 55/24; F16H 19/04; F16H 55/26; B62D 3/123; B62D 5/0409; B62D 3/12; B62D 3/126; B21K 1/767; B21K 1/768
USPC ....................................... 74/422, 388 PS, 409
See application file for complete search history.

(56) References Cited

U.S. PATENT DOCUMENTS

| 5,615,582 A | 4/1997 | Rupp |
| 5,802,919 A * | 9/1998 | Phillips .......................... 74/422 |
| 7,197,956 B2 | 4/2007 | Bieber et al. |
| 7,487,984 B1 | 2/2009 | Lemont, Jr. et al. |
| 7,930,951 B2 * | 4/2011 | Eickholt ................... 74/388 PS |
| 2003/0074996 A1 | 4/2003 | Camp |
| 2005/0039554 A1 | 2/2005 | Bieber et al. |
| 2007/0209463 A1 * | 9/2007 | Song et al. ................ 74/388 PS |
| 2008/0202271 A1 | 8/2008 | Heo |
| 2010/0024583 A1 | 2/2010 | Kawakubo et al. |
| 2011/0297472 A1 | 12/2011 | Bareis |

FOREIGN PATENT DOCUMENTS

| DE | 201 14 759 | 1/2002 |
| DE | 102 08 948 | 9/2003 |
| DE | 10 2008 049 489 | 5/2009 |
| DE | 10 2008 042 134 | 3/2010 |
| DE | 10 2008 054 782 | 7/2010 |
| DE | 10 2009 046 304 | 5/2011 |
| EP | 0 680 430 | 11/1995 |
| WO | WO-01/96167 | 12/2001 |
| WO | WO-2010/069942 | 6/2010 |

* cited by examiner

*Primary Examiner* — Justin Krause
(74) *Attorney, Agent, or Firm* — Jordan and Hamburg LLP

(57) ABSTRACT

A device for pressing a rack onto a pinion engaged with the rack, for a steering system of a motor vehicle, is equipped with a pressure piece, which can be loaded in the direction of the rack by way of a compression spring and is displaceably guided in a housing, and with an adjusting device for compensating play that occurs in the steering system. A spring washer is disposed between the adjusting device and the pressure piece, wherein the adjusting device has shoulder and the pressure piece has a recess or the pressure piece has a shoulder and the adjusting device has a recess in the region of the spring washer. The adjusting device further comprises two adjusting disks which are rotatable relative to one another and beat against one another at contact surfaces, and the contact surfaces have at least two beveled edges. The complete adjusting device is preinstalled as an assembly unit comprising the pressure piece, the spring washer, and the compression spring with the use of a spring pin.

10 Claims, 2 Drawing Sheets though the device 10 for pressing the rack exclusively serves for compensating the tolerances, wear and creep deformation in that the pressure piece 13 is pressed against the rack with relatively high preload, the additional compensation of a play between the rack and the pinion, which results from irregularities in the toothing, out-of-roundness of the pinion or other nonconformities, takes place by way of the relatively soft spring washer 22, which, via the recess 23 in the pressure piece, has space for the necessary spring travel.

DEVICE FOR PRESSING A TOOTHED RACK

This is a Continuation of PCT/DE2011/075113 Filed May 17, 2011.

BACKGROUND OF THE INVENTION

The invention relates to a device for pressing a rack onto a pinion.

Document EP 0 680 430 B1 makes known a device for pressing a rack onto a pinion engaged with the rack, in particular for a steering system of a motor vehicle, wherein, in order to eliminate or adjust the pressure piece play, component tolerances of the pinion, the rack, the housing, and the pressure piece are eliminated and specified pressure piece play is set by way of a selective installation of various retaining rings having different thicknesses. A gradation of 0.05 mm is usually utilized, which means that, given possible tolerance ranges of approximately 0.5 to 1 mm, a large number of various retaining rings having graduated thicknesses is necessary. A further disadvantage is that adjustments required due to wear and creep deformation of individual parts are not easily possible during operation.

A device for pressing a rack, in which existing tolerances can be easily eliminated and specified pressure piece play can be set, was therefore proposed in the older patent application DE 10 2008 054 782.4.

In order to compensate for tolerance, an adjusting device having two adjusting disks is provided, said adjusting disks being rotatable relative to one another and bearing against one another at contact surfaces, wherein the contact surfaces have at least two beveled edges. The two adjusting disks can be braced against one another by way of a torsion spring disposed therebetween, thereby making it possible to compensate for tolerances of the individual components.

The adjusting device further comprises a spring washer, which is disposed between the pressure piece and the first of the two adjusting disks facing the pressure piece. A shoulder is provided therefor, wherein this shoulder is provided in the pressure piece or on the adjusting disk and the other part has a recess. The shoulder of the adjusting device or the pressure piece results in play that is at least great enough, for example, to compensate for irregularities on the toothing between a pinion and a rack, the out-of-roundness of the pinion, or other nonconformities. The recess in the pressure piece or in the adjusting device allows the spring washer to have the range of spring it requires in order to compensate for the aforementioned play.

According to the older application, the adjusting device having the two adjusting disks and the torsion spring is designed as an assembly unit, wherein the two adjusting disks are fastened to one another by way of a screw and are prevented from rotating. After the subsequent installation of the compression spring, the adjusting screw is tightened with a certain amount of torque, thereby bridging the play achieved via the shoulder. Next, the adjusting disk is reopened by a certain angle, wherein the angle of opening should correspond to the play achieved via the shoulder. Finally, the adjusting screw must be safeguarded against rotation, for example via caulking or bonding.

The present invention is based on a further improvement of the older application, in particular a simpler assembly, wherein the advantages related to specified pressure piece play and tolerance compensation should be retained.

SUMMARY OF THE INVENTION

As shown, the complete adjusting device comprising the pressure piece, the spring washer and the compression spring is now designed as a preassembled assembly unit. A spring pin is used for this purpose instead of a clamping screw, said spring pin bearing with preload on one side against a shoulder of the pressure piece and on the other side against the back side of the adjusting disk facing away from the beveled edges.

For final assembly, the assembly unit, which has been preassembled outside of the steering gear, is slid into a housing bore of the housing. Next, the assembly unit is secured in the housing bore. This can take place, advantageously, by way of a retaining ring, which can be disposed in a housing groove.

In order to compensate for tolerance, the rotation of the two adjusting disks relative to one another can take place by way of a torsion spring disposed between the two adjusting disks.

For preassembly, the spring pin is guided through axially extending slots in the adjusting disks and bears, via an extension at the anterior end thereof facing the pressure piece, against the shoulder of the pressure piece. On the other side, this also bears with preload via a shoulder against the back side of the adjusting screw facing away from the beveled edges.

In order to preload the reassembled assembly unit, the slots in the adjusting disks can be rotated in an advantageous manner with respect to one another by a few angular degrees in the circumferential direction.

The shoulder on the pressure piece can be equipped with rising bevels for play-free connection of the assembly unit.

The spring pin, by way of which the individual parts of the assembly unit are held together, is removed after final assembly.

Advantageous developments and embodiments will become apparent from the dependent claims and the exemplary embodiment described in principle with the aid of the drawings below.

DESCRIPTION OF THE PREFERRED EMBODIMENTS

Figure 1:
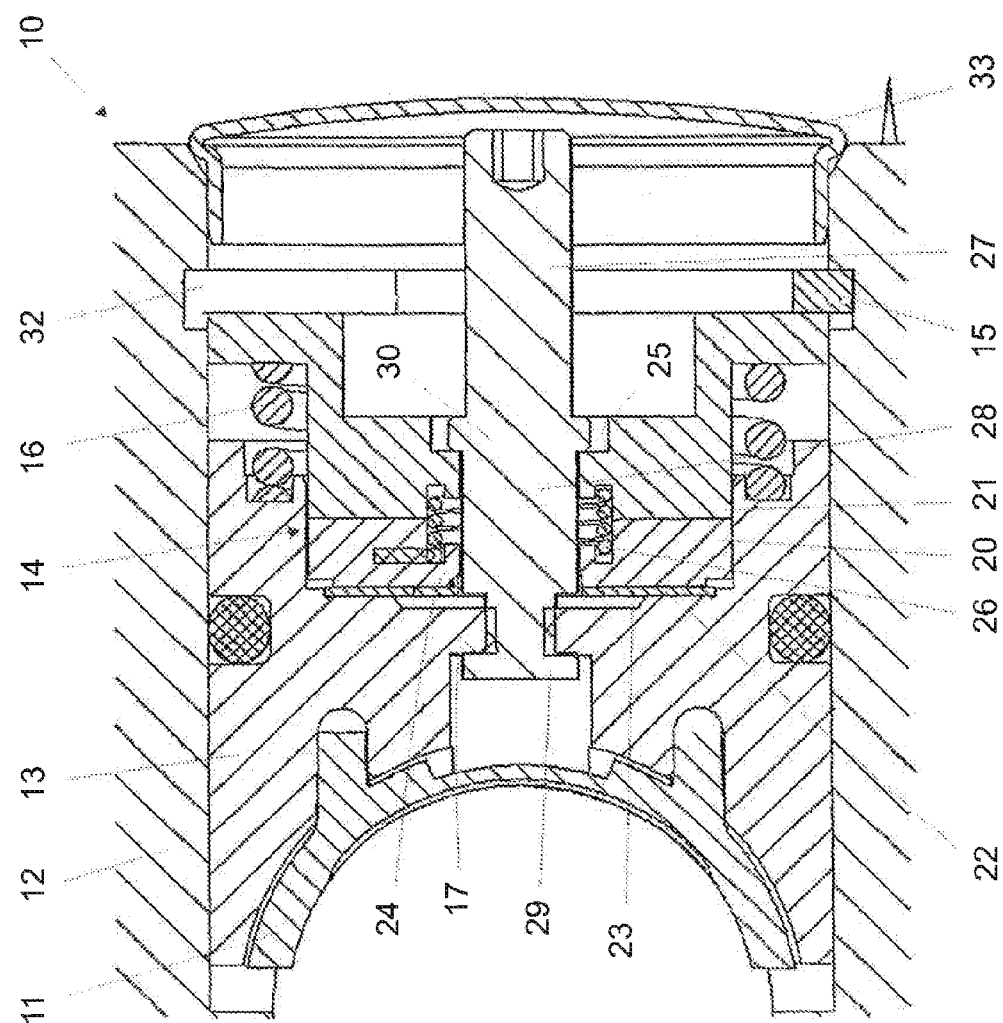
FIG. 1: a sectional view through the device according to the invention comprising the pressure piece and the adjusting device.

FIG. 1 shows a device 10 for pressing a rack, which is not shown here, against a pinion, which is also not shown, for a steering system of a motor vehicle. A foil insert 11 lies between the pressure piece 13 and the rack, which is not shown here; an adjusting device 14 is disposed adjacent to or behind the side of the pressure piece facing away from the rack. A compression spring 16, which presses the pressure piece 13 against the not-shown rack, is disposed between a retaining ring 15 and the pressure piece 13. The adjusting device 14 comprises two adjusting disks 20 and 21. A spring washer 22 is disposed between the adjusting disk 20 facing the pressure piece 13 and the pressure piece. A recess 23 is provided in the pressure piece 13. The two adjusting disks 20, 21 bear against one another at contact surfaces provided with beveled edges 18, 19 (see FIG. 2).

In order to ensure that a simple retaining ring 15 can be utilized instead of the adjusting screw of the older application, there must be compensation for the component tolerances. This is achieved by way of the adjusting device 14, which first compensates for the tolerance range and then the wear and creep deformation that arise during operation. The pressure piece play is set via the spring washer 22 and a shoulder 24 in the adjusting disk 20.

The complete adjusting device 14 is preassembled as an assembly unit outside of the steering gear by way of a spring pin 27, the assembly unit comprising the pressure piece 13, the spring washer 22, the compression spring 16, and the two adjusting disks 20, 21 together with a torsion spring 26 located between the two adjusting disks 20, 21. To this end, the spring pin 27 bears with preload on one side against a shoulder 17 of the pressure piece 13 and on the other side against the back side of the adjusting disk 21, which lies on the side facing away from contact surfaces having the beveled edges 18, 19 of the two adjusting disks 20, 21.

The torsion spring 26 is preloaded by way of the two adjusting disks 20, 21 and is held in the preinstalled position. This preinstalled position of the two adjusting disks is retained via a pivot with cheeks 28 of the spring pin 27.

The front end of the pivot with cheeks 28 is provided with a diameter reduction and, adjacent thereto, two opposing extensions 29, which bear against the shoulder 17 of the pressure piece 13. At an annular recess 25, the spring pin bears via a further annular shoulder 30 against the end face of the adjusting disk 21 facing away from the pressure piece 13.

Figure 2:
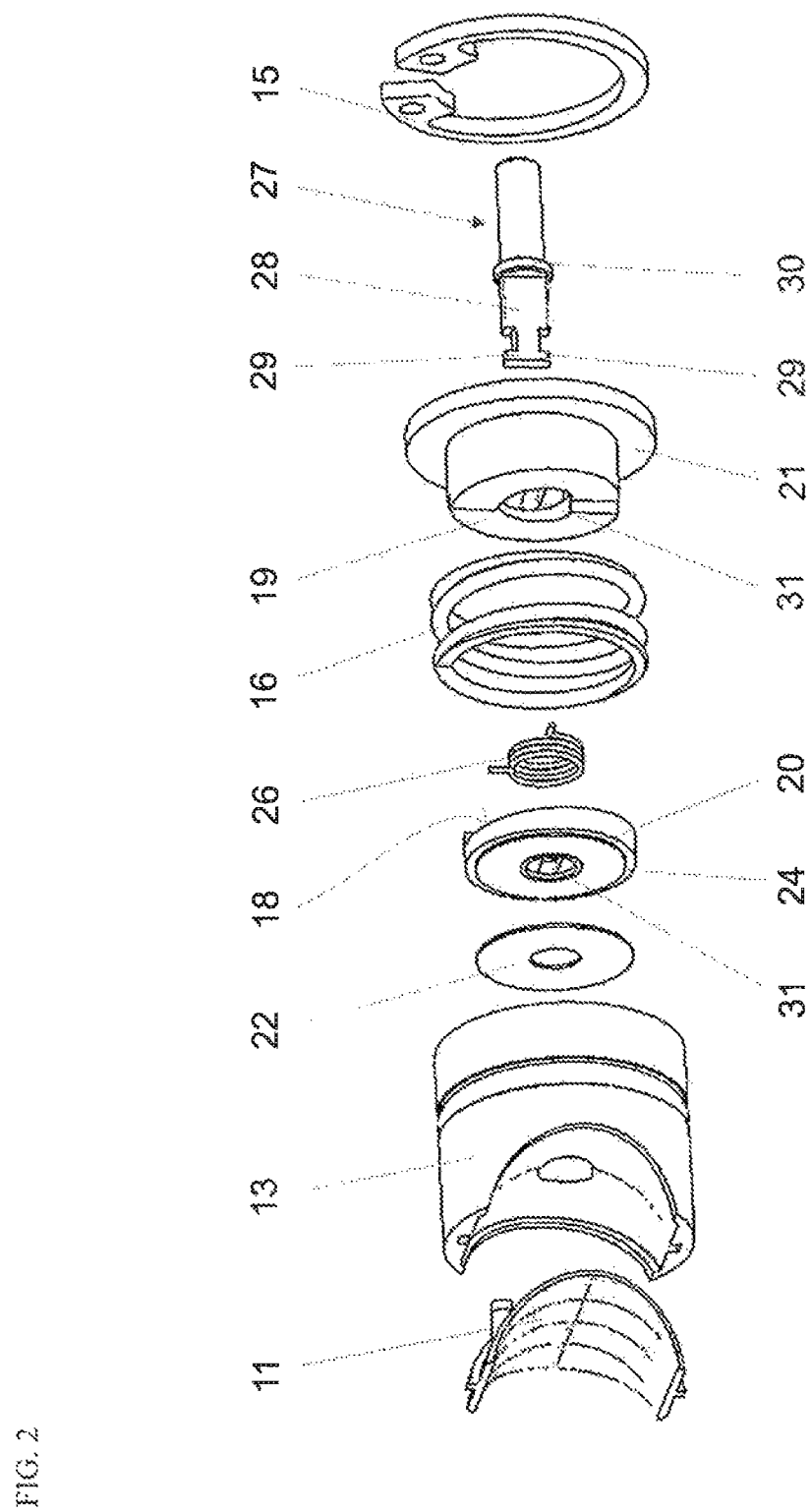
FIG. 2: a perspective view in an exploded representation of the device according to the invention according to FIG. 1 without the housing.

The pivot with cheeks 28 of the spring pin 27 is slid through axially extending slots 31 in the adjusting disks 20, 21 (see FIG. 2). The slots 31 of the two adjusting disks 20, 21 are rotated with respect to one another by a few angular degrees in the circumferential direction in order to attain preload.

For assembly, the adjusting device comprising the spring pin 27 is inserted into the pressure piece 13 having the installed spring washer 22 and the compression spring 16, and is rotated. The annular shoulder 29 of the spring pin 27 functions as a key. Since the shoulder 17 in the pressure piece 13 is provided with rising bevels, a play-free connection of the preinstallation assembly can be established.

The assembly unit is then slid into a bore of the housing 12, wherein the assembly unit is then positioned by way of a retaining ring 15 inserted into a housing groove 32 of the housing 12. The spring pin 27 is then rotated and pulled outwardly for removal. The pressure piece 13 is activated in this manner, wherein the two adjusting disks 20, 21 are rotated against one another via the torsion spring 26. Due to the two beveled edges 18, 19 of the adjusting disks 20, 21, axial displacement and, therefore, tolerance compensation for the individual components takes place. The two beveled edges 18, 19 in the end-face contact surfaces of the adjusting disks 20, 21 are designed as 2×180° in order to also permit high component tolerances and wear to be compensated, especially since adjustment can no longer be performed by way of the retaining ring 15 as compared to the adjusting screw in the older application.

The device is closed in the bore of the housing 12 with respect to the outside by way of a simple cover 33 on the side facing away from the rack.

LIST OF REFERENCE CHARACTERS

10 device
11 foil insert
12 housing
13 pressure piece
14 adjusting device
15 retaining ring
16 compression spring
17 shoulder
18 beveled edge
19 beveled edge
20 adjusting disk
21 adjusting disk
22 spring washer
23 recess
24 shoulder
25 recess
26 torsion spring
27 spring pin
28 pivot with cheeks
29 expansion of the pivot with cheeks
30 annular shoulder
31 slots
32 housing groove
33 cover

The invention claimed is:

1. A device for pressing a rack onto a pinion engaged with the rack in a steering system of a motor vehicle, comprising:
a pressure piece, which can be loaded in the direction of the rack by way of a compression spring and is displaceably guided in a housing;
an adjusting device for compensating for play that occurs in the steering system; and
a spring washer disposed between the adjusting device and the pressure piece; and
wherein the adjusting device has a shoulder and the pressure piece has a recess, or the pressure piece has a shoulder and the adjusting device has a recess in the region of the spring washer; and
wherein the adjusting device further has two adjusting disks, which are rotatable relative to one another and bear against one another at contact surfaces, and the contact surfaces have at least two beveled edges; and
wherein an assembly unit comprising the adjusting device, the pressure piece, the spring washer, and the compression spring is pre-assembled with a spring pin that extends axially along a central axis of the assembly unit to hold the adjusting device, the pressure piece, the spring washer, and the compression spring together as the assembly unit during installation.

2. The device according to claim 1, wherein the spring pin bears with preload on one side against the pressure piece and, on the other side, against the back side of the adjusting disk facing away from the beveled edges.

3. The device according to claim 1, wherein a torsion spring is disposed between the two adjusting disks.

4. The device according to claim 1, wherein the spring pin is guided through axially extending slots in the adjusting disks.

5. The device according to claim 1, wherein the assembly unit inserted into a housing bore of the housing is held on the side facing away from the rack by a retaining ring.

6. The device according to claim 5, wherein the retaining ring is disposed in a housing groove.

7. The device according to claim 1, wherein each of the beveled edges extends for 180°.

8. The device according to claim 1, wherein the shoulder on the pressure piece is provided for a play-free connection of the assembly unit and has rising bevels.

9. The device according to claim 1, wherein the assembly unit is installed within the housing and fixed within the housing by a retaining ring.

10. A device for pressing a rack onto a pinion engaged with the rack in a steering system of a motor vehicle, comprising:
a pressure piece, which can be loaded in the direction of the rack by way of a compression spring and is displaceably guided in a housing; and an adjusting device for compensating for play that occurs in the steering system;

wherein a spring washer is disposed between the adjusting device and the pressure piece;

wherein the adjusting device has a shoulder and the pressure piece has a recess, or the pressure piece has a shoulder and the adjusting device has a recess in the region of the spring washer; and wherein the adjusting device further has two adjusting disks, which are rotatable relative to one another and bear against one another at contact surfaces, and the contact surfaces have at least two beveled edges;

wherein an assembly unit comprising the adjusting device, the pressure piece, the spring washer, and the compression spring is pre-assembled with a spring pin that bears with preload on one side against the pressure piece and, on the other side, against the back side of the adjusting disk facing away from the beveled edges; and wherein the spring pin bears against a shoulder of the pressure piece.

* * * * *